(12) United States Patent
Morishita et al.

(10) Patent No.: US 6,586,867 B2
(45) Date of Patent: Jul. 1, 2003

(54) GLASS SPACER OF PARTICULAR COMPOSITION AND ELECTRON-BEAM EMITTING DISPLAY DEVICE

(75) Inventors: Masahiro Morishita, Osaka (JP); Katsuya Kamisaku, Osaka (JP); Toshiaki Mizuno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 11 days.

(21) Appl. No.: 09/947,470

(22) Filed: Sep. 7, 2001

(65) Prior Publication Data

US 2002/0060513 A1 May 23, 2002

(30) Foreign Application Priority Data

Sep. 27, 2000 (JP) .......................... 2000-294537

(51) Int. Cl.$^7$ .............................. H01J 1/88; H01J 19/42; H01K 1/18
(52) U.S. Cl. ...................... 313/292; 313/609; 313/610; 252/62.3 R; 252/62.3 E; 252/62.3 ZB
(58) Field of Search ................................ 313/292, 250, 313/256, 259, 268, 609, 610; 252/62.3, 500

(56) References Cited

U.S. PATENT DOCUMENTS 6,197,480 B1 * 3/2001 Iguchi et al. ............ 430/286.1

FOREIGN PATENT DOCUMENTS

| JP | 07-230776 | 8/1995 |
| JP | 2000-203857 | 7/2000 |

* cited by examiner

Primary Examiner—Vip Patel
Assistant Examiner—Kevin Quarterman
(74) Attorney, Agent, or Firm—Kanesaka & Takeuchi

(57) ABSTRACT

A glass spacer for an electron-beam emitting display device is composed of non alkaline glass having almost the same linear expansion coefficient as that of soda-lime-silica glass. The glass includes $SiO_2$ with 10 to 35 percent by mass, RO, in which "R" refers to an alkaline earth metal, with 20 to 60 percent by mass, $B_2O_3$ with 9 to 30 percent by mass and $Al_2O_3$ with 0 to 10 percent by mass, and which is substantially free of alkali. The linear expansion coefficient of the glass spacer is in a range from $76 \times 10^{-7}/°C$. to $92 \times 10^{-7}/°C$. The glass spacer may further include $La_2O_3$ with 0 to 30 percent by mass, ZnO with 0 to 8 percent by mass and $TiO_2$ with 0 to 5 percent by mass.

7 Claims, 1 Drawing Sheet

GLASS SPACER OF PARTICULAR COMPOSITION AND ELECTRON-BEAM EMITTING DISPLAY DEVICE

FIELD OF THE INVENTION

The present invention relates to a glass spacer for an electron-beam emitting display device and an electron-beam emitting display device with the glass spacer. More particularly, the present invention relates to the glass spacer for an electron-beam emitting display device composed of non alkaline glass which is substantially free of alkali and has about the same linear expansion coefficient as that of soda-lime-silica glass and it also relates to the electron-beam emitting display device with the glass spacer.

BACKGROUND OF THE INVENTION

The electron-beam emitting display of a light self-emitting type has been served widely as the display of a flat type which provides brighter images and wider angles of view than those of liquid-crystal display devices. The electron-beam emitting display of the light self-emitting type directs electron-beams generated by electron-beam generators at fluorescent members so that the fluorescent members emit fluorescence to form images.

Since the electron-beam emitting display of the flat type forms images by directing electron beams at fluorescent members, components of the display including the electron-beam generators and the fluorescent members are installed in a vacuum container having the internal pressure of $10^{-3}$ Pa or less. Japanese patent publication H7-230776A discloses a vacuum container having resistance to the atmospheric pressure as shown in FIG. 1.

FIG. 1 shows an exploded perspective view of the electron-beam emitting display of a flat type. The display has a front panel 1 which is composed of a glass panel 15 and an image-forming member 5 which is formed on the internal surface of the glass panel 15, and also a back panel 2 carrying a group of electron-emitting elements which will be described later. The image-forming member 5 includes a fluorescent member which emits light when irradiated with an electron beam generated from the electron-emitting elements. The front panel 1 and the back panel 2 are hermetically connected in such a manner that a supporting core frame 3 is interposed in between the panels 1 and 2 as shown in FIG. 2 which illustrates the section of the display along 2—2 line of FIG. 1, and thus the panels 1, 2 and the flame 3 compose a hermetical structure having resistance to atmospheric pressure. Glass spacers 4 are inserted in between the front panel 1 and the back panel 2 to support the panels 1 and 2 against the atmospheric pressure.

The back panel 2 has a glass base 21, element portions 23 composed of Ni, which have a thickness of 100 nm and are disposed on the glass base 21 in a matrix-like arrangement, and wiring portions 24 composed of Ag, which have a thickness of 2 μm and are formed on the glass base 21 so as to supply electricity to the element portions 23. Each of the element portions 23 has an electron-emitting element 25. The wiring portions 24 are arranged in parallel with each other and each pair of the adjacent wiring portions 24 simultaneously supplies electricity to the plural electron-emitting elements 25 which exist along the pair. And furthermore, modulating electrodes, not shown in FIG. 1, each of which includes an electron-passing hole having a diameter of 50 μm, are disposed 10 μm above the glass base 21 with insulation layers of $SiO_2$ interposed between the electrodes and the glass base 21 respectively.

At the surface of the back panel 2, each of the glass spacers 4 is in contact with the top of the wiring portion 24 which exists between a pair of adjacent lines of the electron-emitting elements 25, and at the surface of the front panel 1. Each glass spacer 4 is in contact with one of black stripes where the fluorescent member of the image forming member 15 is not to be irradiated with electrons emitted by the electron-emitting elements 25.

Japanese patent publication H12-203857A describes a method of producing glass spacers for an electron-beam emitting display device with high accuracy, wherein a base glass material having a sectional shape of a close analogy to the desired shape of that of the glass spacers is prepared, the base glass material is heated to have a viscosity of $10^5$ to $10^9$ poise, and the glass material is drawn to form the glass spacer.

According to this method, it becomes easy to form the glass spacers in the desired shape as the analogy in the shape of the section between the base glass material and the drawn base glass material is improved.

In the above Japanese patent publication H12-203857A, such glass composition as shown in the following Table 1 is employed to compose the glass spacers.

TABLE 1

| | soda-lime-silica glass | low-alkali glass | non-alkali glass |
|---|---|---|---|
| composition [% by mass] | | | |
| $SiO_2$ | 72 ~ 73 | 56 ~ 58 | 57 ~ 59 |
| $Al_2O_3$ | 1.0 ~ 1.5 | 5 ~ 7 | 13 ~ 15 |
| $Fe_2O_3$ | about 0.1 | about 0.1 | |
| $B_2O_3$ | | | 9 ~ 11 |
| $ZrO_2$ | | 2 ~ 3 | |
| MgO | 4 ~ 5 | 2 ~ 3 | 1 ~ 2 |
| CaO | 8 ~ 9 | 4 ~ 6 | 3 ~ 5 |
| SrO | | 5 ~ 7 | 3 ~ 4 |
| BaO | | 6 ~ 8 | 4.5 ~ 6 |
| $Na_2O$ | 12.5 ~ 13.5 | 3.5 ~ 5.0 | 0.1 |
| $K_2O$ | 0.5 ~ 1.2 | 5 ~ 8 | |
| linear expansion coefficient [x $10^{-7}$/° C.] | 88 ~ 92 | 76 ~ 84 | 35 ~ 40 |
| annealing temperature [° C.] | 550 ~ 555 | 620 ~ 625 | 708 ~ 720 |
| strain temperature [° C.] | 507 ~ 520 | 570 ~ 280 | 668 ~ 680 |
| specific gravity [g/cm³] | 2.47 ~ 2.52 | 2.70 ~ 2.81 | 2.5 ~ 2.55 |

The front panel and the back panel of the display normally are composed of soda-lime-silica glass.

As shown in FIGS. 1 and 2, the glass spacers are interposed in between the front panel and the back panel of the vacuum container having resistance to the atmospheric pressure so as to keep the spacing between the panels constant. However, since the glass spacers are exposed to the electron-emitting elements, there can arise such a problem that movable ions such as Na included in the glass of the spacer are unevenly distributed under the influence of bias voltage and, thus, cause the breakage of the electric field. Therefore, the glass spacers are desirable to be composed of non alkaline glass composition in order to prevent the above problem. However, the glass spacers are, on the other hand, desirable to have the same linear expansion coefficient as that of the soda-lime-silica glass which constitutes the front and back panels because the glass spacers are fixed to the back panel of the electron-beam emitting display device by fusion welding at a temperature of about 500° C. or lower with using a low-melting glass frit.

The non alkaline glass composition employed in the Japanese patent publication H12-203857A is not suitable for the glass spacers for the electron-beam emitting display device because its linear expansion coefficient is 35 to $40 \times 10^{-7}/°$ C. and differs far from that of the soda-lime-silica glass.

OBJECT AND SUMMARY OF THE INVENTION

It is an object of the present invention to solve conventional problems as mentioned above and to provide a glass spacer for an electron-beam emitting display device which is composed of non alkaline glass having almost the same linear expansion coefficient as the soda-lime-silica glass, and also provide an electron-beam emitting display device equipped with the glass spacer.

The glass spacer for an electron-beam emitting display device of the present invention is composed of non alkaline glass which is substantially free of alkaline metals and includes $SiO_2$ of 10 to 35 percent by mass, RO, in which "R" refers to an alkaline earth metal, of 20 to 60 percent by mass, $B_2O_3$ of 9 to 30 percent by mass and $Al_2O_3$ of 0 to 10 percent by mass, and the linear expansion coefficient of which is $76 \times 10^{-7}$ to $92 \times 10^{-7}/°$ C.

The glass spacer composed of the non alkaline glass which is substantially free of alkali does not cause the electric field breakage arisen from the alkali. The glass spacer is not fractured due to the difference of thermal expansion between the glass spacer itself and the soda-lime-silica glass because the linear expansion coefficient of the non alkaline glass is $76 \times 10^{-7}$ to $96 \times 10^{-7}/°$ C. and is approximately equal to that of the soda-lime-silica glass.

In the present invention, the non alkaline glass which constitutes the glass spacer is preferable to have a linear expansion coefficient particularly of $78 \times 10^{-7}$ to $88 \times 10^{-7}/°$ C.

The non alkaline glass may further include $La_2O_3$ of 0 to 30 percent by mass, ZnO of 0 to 8 percent by mass and $TiO_2$ of 0 to 5 percent by mass.

The electron-beam emitting display device of the present invention is equipped with the glass spacers.

It should be noted that the "linear expansion coefficient" refers to the average value thereof at temperatures from 30° C. to 400° C.

DETAILED DESCRIPTION OF THE PREFERRED EMBODIMENTS

Figure 1:
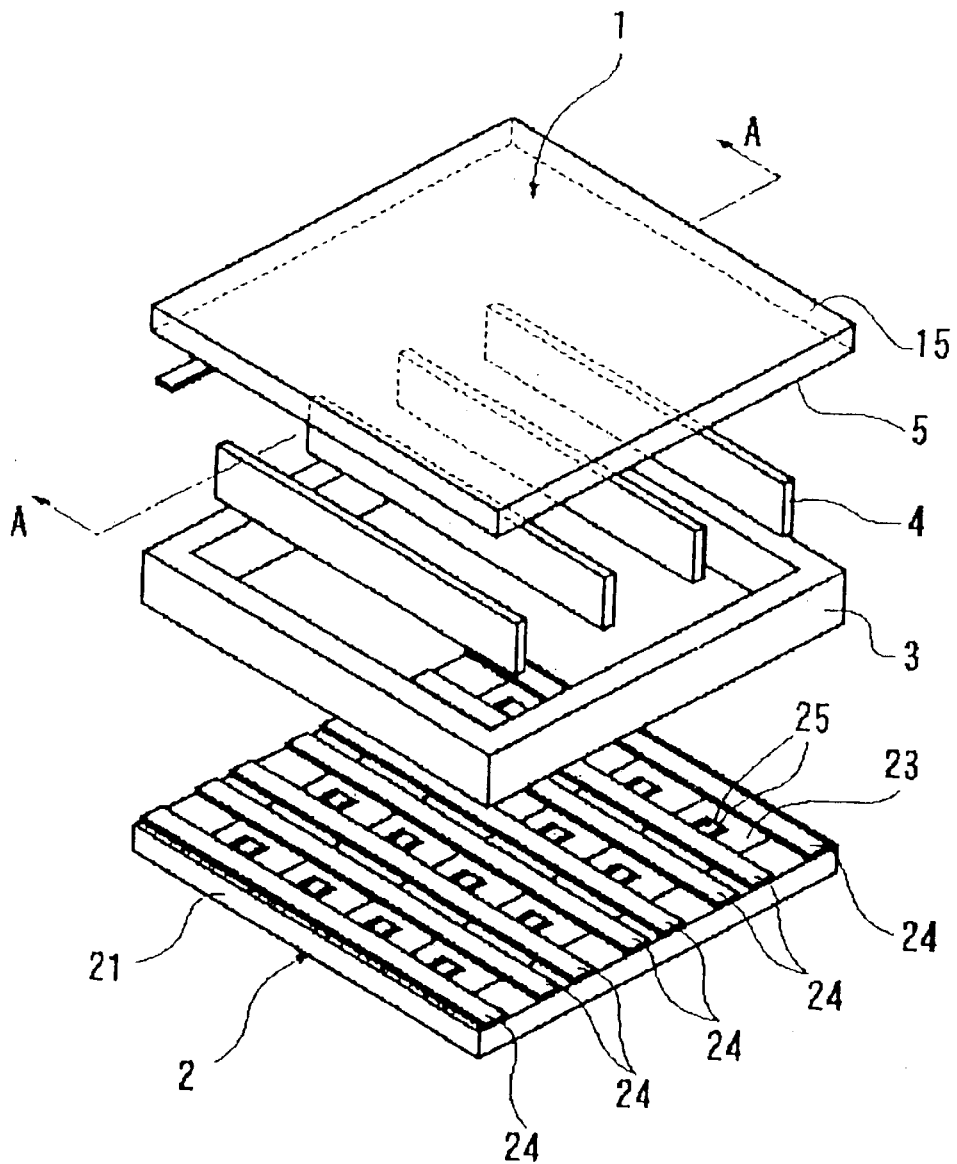
FIG. 1 is an exploded perspective view of an electron-beam emitting display device of a flat type.

The glass spacer for an electron-beam emitting display device of the present invention is composed of the non alkaline glass substantially free of the alkali which includes:

$SiO_2$ of 10 to 35 percent by mass;

RO of 20 to 60 percent by mass wherein "R" refers to any alkaline earth metal;

$B_2O_3$, of 9 to 30 percent by mass; and $Al_2O_3$ of 0 to 10 percent by mass.

The glass may further includes;

$La_2O_3$, of 0 to 30 percent by mass;

ZnO of 0 to 8 percent by mass; and $TiO_2$ of 0 to 5 percent by mass as required.

In the present invention, "substantially free of the alkali" means that the content of the alkali metals, i.e. Li, Na and K, is 5000 ppm at most.

$SiO_2$ is an essential component for forming the three dimensional network structure of the glass. Too much amount of $SiO_2$ lowers the linear expansion coefficient of the glass below the range of $76 \times 10^{-7}$ to $92 \times 10^{-7}/°$ C. which is equivalent to that of ordinary soda-lime-silica glass. The linear expansion coefficient of the non alkaline glass is generally lower than that of the soda-lime-silica glass, and $SiO_2$ has an effect of lowering the coefficient. Therefore, in the present invention, the content of $SiO_2$ should be 35 percent by mass or less. However, since $SiO_2$ with less than 10 percent by mass can not form the three dimensional network structure of the glass, the content of $SiO_2$ should be 10 to 35 percent by mass, more preferably 13 to 34 percent by mass.

$Al_2O_3$ is a component for improving the durability of glass, and has an effect of lowering the linear expansion coefficient of glass, like $SiO_2$. Accordingly, the content of $Al_2O_3$3 should be 0 to 10 percent by mass, and is preferably 0 to 8 percent by mass.

$B_2O_3$ is a component for improving the durability of the glass and prompting the glass to melt. The content of $B_2O_3$ is 9 to 30 percent by mass, and preferably 10 to 28 percent by mass.

RO which is at least one selected from the group consisting of BaO, CaO, MgO, and SrO improves the durability of the glass, controls the viscosity of glass and increases the linear expansion coefficient of glass. The glass includes the RO not less than 20 percent by mass in order to achieve the linear expansion coefficient of $76 \times 10^{-7}$ to $92 \times 10^{-7}/°$ C. However, since too large amount of the RO relatively reduces the content of the other ingredients, the desired glass can not be obtained. Thus, the content of the RO should be 20 to 60 percent by mass, and is preferably 30 to 55 percent by mass.

The glass spacer for the electron-beam emitting display device of the present invention may further include $La_2O_3$ with 0 to 30 percent by mass, ZnO with 0 to 8 percent by mass and $TiO_2$ with 0 to 5 percent by mass.

While the non alkaline glass is substantially free of the alkali, it has a linear expansion coefficient of $76 \times 10^{-7}$ to $92 \times 10^{-7}/°$ C., preferably $78 \times 10^{-7}$ to $88 \times 10^{-7}/°$ C., which is almost identical to that of the soda-lime-silica glass. The glass spacer of the present invention consisting of the above glass can accordingly be integrated with a front panel and a back panel of an electron-beam emitting display device which are composed of soda-lime-silica glass.

The glass spacer of the present invention is preferable to be produced by a method described in Japanese patent publication H12-203857A.

The glass spacer of the present invention is formed from a base material having a close analogy shape to that of the glass spacer with a prescribed aspect ratio (height/thickness ratio). The base glass material is drawn while being heated at a temperature at which the material is substantially softened, and then the drawn base glass material is cut to a prescribed length. However, the method for forming the glass spacer of the present invention is not limitative to that of Japanese patent publication H12-203857A.

The electron-beam emitting display of a flat type, as mentioned above with reference to FIGS. 1 and 2, has the front panel 1 and the back panel 2, wherein the front panel 1 is composed of the glass panel 15 and the image-forming member 5 which is formed on the internal surface of the front panel 1, and the back panel 2 carries a group of the electron-emitting elements. The image-forming member 5 includes the fluorescent member which emits light when irradiated with electron-beams generated from the electron-emitting elements. The front panel 1 and the back panel 2 are hermetically connected in such a manner that the supporting core flame 3 is interposed in between the panels 1 and 2, and thus the panels 1, 2 and the flame 3 compose a hermetical structure having resistance to atmospheric pressure. Furthermore, the glass spacers 4 are inserted between the front panel 1 and the back panel 2 to support the panels 1 and 2 against atmospheric pressure.

Each glass spacer 4, for example, is shaped in the form of a plate having a thickness of 0.2 mm and a height of 5 mm, and is fixed to the back panel 2 in a way that its bottom is bonded to the panel 2 with a bonding member 8. The glass spacer 4 may be fixed to the front panel 1 in a way that its top is bonded to the panel 1 with the bonding member 8 instead of bonding its bottom to the back panel 2. The glass spacer 4 may be fixed to both of the front panel 1 and the back panel 2 in a way that both of its top and bottom are bonded to the panel 1 and the panel 2 respectively with the bonding members 8. The aspect ratio (height/thickness ratio) of the section of the glass spacer can be 4 to 50.

The glass spacer 4 has preferably a thickness of 0.03 to 0.25 mm. The glass spacer should have a thin thickness, since the electron-beam emitting display device can not distribute light so as to display images at portions where the glass spacers are in contact with the front panel and the back panel. However, the glass spacer having a thickness less than 0.03 mm does not have enough strength and difficulty of handling.

The wiring portion 24, on the top of which the glass spacer 4 is to be disposed in order to increase the open area of the electron-beam emitting display device, has usually a width of 0.25 mm at most. Therefore, the thickness of the glass spacer 4 is preferable not to exceed the width of the wiring portion 24.

The glass spacer 4 has preferably a height of 0.7 to 5 mm and more preferably 1 to 5 mm. The glass spacer has preferably a height of not less than 0.7 mm, since a high-accelerating voltage ranging from 5000 to 6000 volts is usually used in the electron-beam emitting display device in order to improve the rate of utilization of the fluorescent members. When the distance which is formed by the glass spacers 4 between the front panel 1 and the back panel 2 is less than 0.7 mm, it is hard to ensure electrical insulation between the panels. However, when the distance between the panels exceeds 5 mm, electron beams emitted by electron-beams sources are distributed so widely that the adjacent picture elements also emit light, and accordingly the glass spacer has preferably a height of not more than 5 mm.

The glass spacer 4 has usually a length of 10 to 1000 mm which may vary depending on the size of the electron-beam emitting display device and the method of forming the glass spacer.

Figure 2:
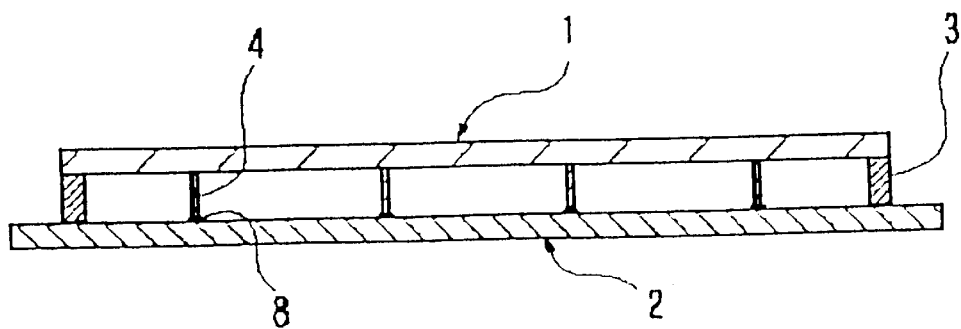
FIG. 2 is a sectional view of the electron-beam emitting display device along 2—2 line of FIG. 1.

The electron-beam emitting display device of the present invention may have a structure as shown in FIGS. 1 and 2 with the glass spacer made up of the non alkaline glass of the present invention.

Hereinafter, the present invention will be described with reference to examples and comparative examples.

EXAMPLES 1 TO 4

Comparative Examples 1 and 2

Samples of glasses having compositions shown in Table 2 were respectively prepared and measured in the linear expansion coefficient, transition point temperature and yield point. The results of the measurement are shown in Table 2.

TABLE 2

|  | Examples | | | | Comparative Examples | |
|---|---|---|---|---|---|---|
|  | 1 | 2 | 3 | 4 | 1 | 2 |
| glass composition [% by mass] | | | | | | |
| SiO$_2$ | 28 | 33 | 15 | 30 | 38 | 41 |
| Al$_2$O$_3$ | 1 | 7 | 1 | 1 | 3 | 14 |
| CaO |  | 25 |  | 4 |  |  |
| BaO | 34 | 16 | 37 | 47 | 42 |  |
| B$_2$O$_3$ | 24 | 12 | 27 | 10 | 17 | 11 |
| La$_2$O$_3$ | 7 | 6 | 20 |  |  |  |
| SrO | 5 |  |  |  |  |  |
| ZnO | 1 | 1 |  | 5 |  |  |
| TiO$_2$ |  |  |  | 3 |  |  |
| KHF$_2$ |  |  |  |  |  | 28 |
| AlF$_3$ |  |  |  |  |  | 6 |
| Na$_2$O |  |  |  |  |  |  |
| K$_2$O |  |  |  |  |  |  |
| linear expansion coefficient [× 10$^7$/° C.] | 76 | 82 | 84 | 85 | 69 | 135 |
| transition point temperature [° C.] | 663 | 659 | 647 | 605 | 663 | 330 |
| yield point [° C.] | 703 | 715 | 682 | 650 | 706 | 425 |

It is apparent from Table 2 that the non alkaline glass of the present invention including no alkali has about the same linear expansion coefficient as that of ordinary soda-lime-silica glass.

On the other hand, the samples of glass of Comparative Examples 1 and 2 each of which includes a larger amount of SiO$_2$ than that of the present invention greatly differ from soda-lime-silica glass in the linear expansion coefficient and thus are unsuitable for the glass spacer of an electron-beam emitting display device.

As described above, the glass spacer for an electron-beam emitting display device of the present invention is composed of non alkaline glass and is substantially free of the alkali metals. The glass spacer has almost the same linear expansion coefficient as that of soda-lime-silica glass which constitutes the front panel and the back panel of an electron-beam emitting display device. The glass spacer can provide a high-quality electron-beam emitting display device which is free of electric field breakage and damage due to difference of the thermal expansion between the glass spacer and the panels thereof.

What is claimed is:

1. A glass spacer for an electron-beam emitting display device composed of non alkaline glass which is substantially free of alkali, said non alkaline glass including:

SiO$_2$ of 10 to 35 percent by mass;

RO of 20 to 60 percent by mass, wherein "R" refers to an alkaline earth metal;

B$_2$O$_3$ of 9 to 30 percent by mass; and

Al$_2$O$_3$ of 0 to 10 percent by mass, and said non alkaline glass having a linear expansion coefficient from 76×10$^{-7}$/° C. to 92×10$^{-7}$/° C.

2. A glass spacer for an electron-beam emitting display device as claimed in claim 1, wherein said linear expansion coefficient of the non alkaline glass is in a range from $78 \times 10^{-7}/°$ C. to $88 \times 10^{-7}/°$ C.

3. A glass spacer for an electron-beam emitting display device as claimed in claim 1, wherein said non alkaline glass further includes:

$La_2O_3$ of 0 to 30 percent by mass;

ZnO of 0 to 8 percent by mass; and $TiO_2$ of 0 to 5 percent by mass.

4. An electron-beam emitting display device equipped with the glass spacer as claimed in claim 1.

5. A glass spacer for an electron-beam emitting display device as claimed in claim 1, wherein said non alkaline glass has a thickness of 0.03 to 0.25 mm, a height of 0.7 to 5 mm, and a length of 10 to 1,000 mm.

6. A glass spacer for an electron-beam emitting display device as claimed in claim 1, wherein said non alkaline glass has a solid plate form.

7. A glass spacer for an electron-beam emitting display device as claimed in claim 1, wherein said RO is at least one material selected from a group consisting of BaO, GaO, MgO and SrO.

* * * * *